(No Model.)

C. NAU.
ANTI-FRICTION ROLLER.

No. 300,110. Patented June 10, 1884.

Witnesses
Jno. K. Smith
W. B. Corwin

Inventor
Charles Nau
by his attorneys
Bakewell & Kerr

UNITED STATES PATENT OFFICE.

CHARLES NAU, OF ALLEGHENY, PENNSYLVANIA.

ANTI-FRICTION ROLLER.

SPECIFICATION forming part of Letters Patent No. 300,110, dated June 10, 1884.

Application filed March 19, 1884. (No model.)

*To all whom it may concern:*

Be it known that I, CHARLES NAU, of the city of Allegheny, in the county of Allegheny and State of Pennsylvania, have invented a new and useful Improvement in Anti-Friction Rollers; and I do hereby declare the following to be a full, clear, and exact description thereof.

My invention relates to an improvement in anti-friction devices; and it consists in the arrangement and construction of rollers between a journal and journal-box or other bearings, as hereinafter appears, reference being had to the accompanying drawings, forming part of this specification, in which—

Figure 1:
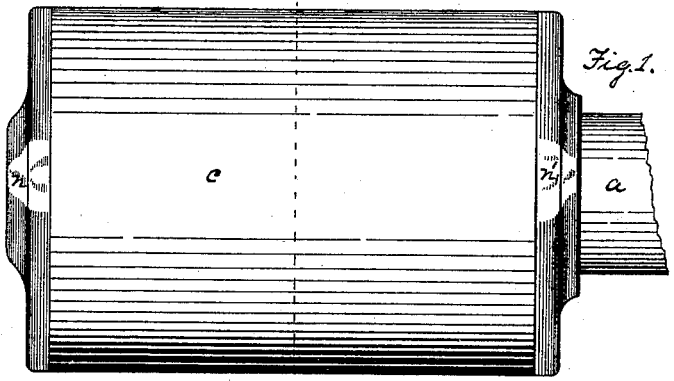
Figure 2:
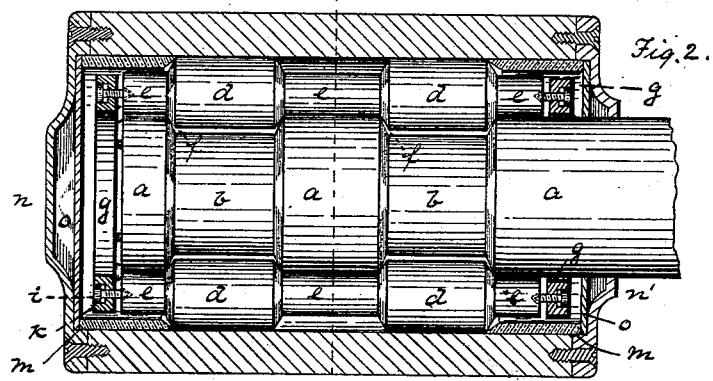
Figure 3:
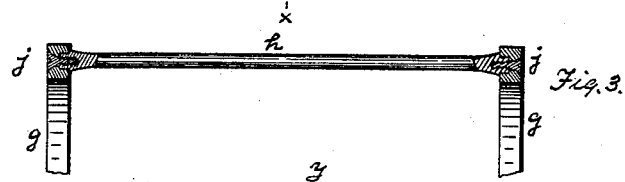
Figure 4:
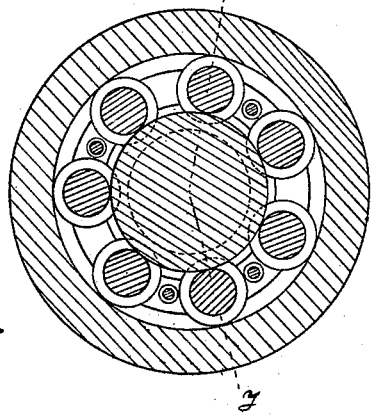

Figure 1 is a side elevation of the journal-box and shaft. Fig. 2 is a vertical sectional view on the line $y\ y$, Fig. 4. Fig. 3 is a view of a portion of the retaining-frame; and Fig. 4 is a cross-section through the journal-box on the line $x\ x$, Fig. 2.

Like letters of reference indicate like parts wherever they occur.

The object of my invention is to lessen as much as possible the friction in journal-bearings, and thereby prevent the wearing away of the bearing-surfaces and the loss of power.

I will now describe my invention, so that others skilled in the art may manufacture and use the same.

In the drawings, $a\ b$ represent the shaft, and $c$ the journal-box, between which are interposed the anti-friction rollers $d\ e$, which, and also the journal, are formed in alternate collars and recessed portions, the collars $d$ of the rollers bearing on the inside face of the journal-box and fitting in the recessed portions $b$ of the journal without coming in contact with the same, while the collars $a$ of the journal bear on the recessed portion $e$ of the rollers, the diameters of the collars $d$ bearing the same proportion to the interior diameter of the journal-box $c$ that the diameters of the recesses $e$ do to the diameters of the journal-collars $a$, and thereby, the diameters of the rolls being suitably proportioned to their respective bearing-surfaces, the rolls revolve on their axes freely without slipping over either the journal or box. In order to retain these rollers in their proper place on the journal of the shaft, and at the same time prevent side friction, the edges of the collars $a$ and $d$ are beveled, so that they shall not come in contact with each other excepting at the line where the collars $d$ meet the ends of the recessed portion $e$, the space $f$ intervening between the two faces or ends, and the rolls are also journaled in the rings $g$ (which are concentric with the journal inside of the box, and are united by the longitudinal braces $h$, secured to the rings by the screws $j$) by the set-screws $i$, the heads of which fit in slots or recesses $k$ in the rings, while the points of the screws enter cavities in the ends of the rollers $d\ e$, which cavities, as well as the ends of the screws, are conical, the sides or faces being formed at a different angle, so that only the point of the screws shall come in contact with the rollers. When the fitting between the rollers and the journal and journal-box is perfect and true, the screws $i$ need not come in contact with the rolls, as the rolls will retain their own proper position. When, however, any of the collars on the rollers or journal become worn at their edges, side motion may be prevented by tightening the set-screws.

In order to keep the rolls in position in the box $c$, collars or rings $m$ are placed at the ends thereof, so that the inside edges or ends thereof shall come in contact with the beveled edges of the outer collars, $d$, on a line, the edges of the collars being also beveled, and between the collars $m$ and the caps $n\ n'$, at the ends of the box, is a rubber or other spring disk, gasket, or washer, $o$, which acts as a buffer, preventing the rollers from jarring in the box.

In mounting the journal in its journal-box the rollers $d\ e$ are first placed around the journal $a\ b$, and then secured to the rings $g$, which are united by the braces $h$. The journal and surrounding rollers are then placed in the journal-box $c$, fitting closely therein, and the collars $m$, gasket $o$, and caps $n\ n'$ are secured in their proper places.

Although I have described a shaft-journal and journal box or bearing arranged in connection with the rollers, the same arrangement may be applied to car-wheels and other bearings of a like nature.

The advantages of my invention are, that not only is all slipping of the direct bearing-surfaces on each other avoided, but side friction is also prevented, and thereby power is saved and the rapid wearing away of the bearing-surfaces is prevented.

I am aware that anti-friction rollers having two diameters, so as to present different bearing-faces to the journal and box, are not new; and also that rollers having beveled edges or ends have been employed to keep the rollers in their proper place on the shaft, and that a slight recess forming a small collar on the shaft, the upper portion of which collar terminates in a beveled portion, has been employed for the same purpose. I do not, therefore, broadly claim the same; but,

Having thus described my invention, what I claim, and desire to secure by Letters Patent, is—

1. The anti-friction rollers having a collar or collars and a recessed portion or portions, so as to form two separate bearing-surfaces of different diameters, in combination with a shaft or journal having similar collar or collars and recess or recesses, the edges or ends of which collars are beveled at different angles, so that they shall not come in contact with each other at their beveled edges, excepting on a line at the apex of the angle, substantially as and for the purpose specified.

2. The anti-friction rollers having beveled edges arranged around a shaft or journal in a journal-box, and securing collars or rings the edges of which are beveled, so that the rollers shall not come in contact therewith at the beveled edges, excepting on a line at the apex of the angles formed by the bevel of the collars and ring, substantially as and for the purpose specified.

3. Anti-friction-rollers interposed between a journal and box, in combination with a spring or springs arranged between the ends of the rollers and the ends of the box, substantially as and for the purpose specified.

In testimony whereof I have hereunto set my hand this 2d day of February, A. D. 1884.

CHARLES NAU.

Witnesses:
W. B. CORWIN,
THOMAS W. BAKEWELL.